C. O. COWGILL & C. B. KIMBLE.
SIGNAL ARM LIGHT.
APPLICATION FILED FEB. 19, 1917.
1,256,521. Patented Feb. 19, 1918.
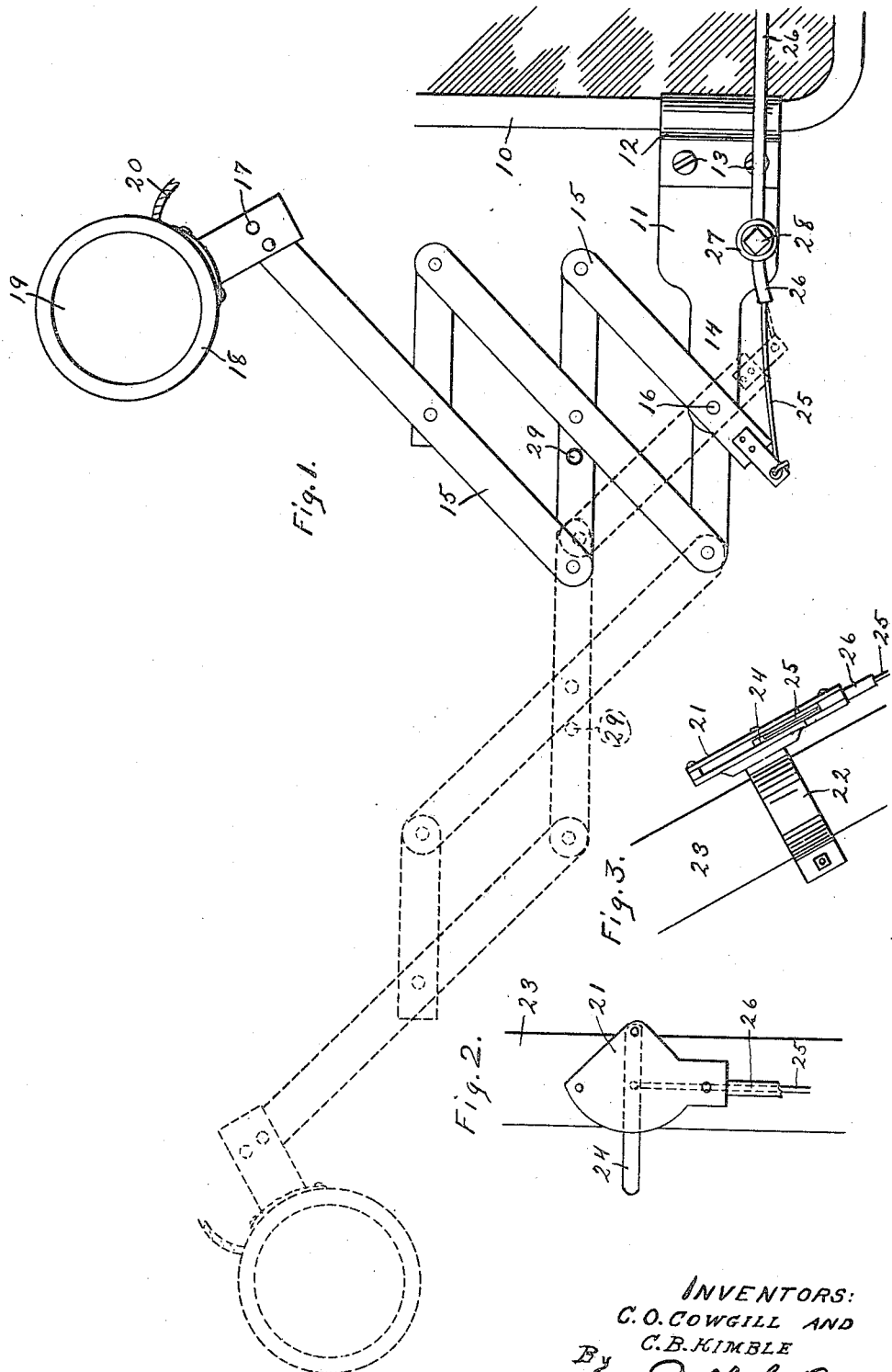
INVENTORS:
C. O. COWGILL AND
C. B. KIMBLE
By Zell G. Roe
Atty.

UNITED STATES PATENT OFFICE.

CHARLES O. COWGILL AND CLYDE B. KIMBLE, OF DES MOINES, IOWA.

SIGNAL-ARM LIGHT.

1,256,521.  Specification of Letters Patent.  Patented Feb. 19, 1918.

Application filed February 19, 1917. Serial No. 149,584.

*To all whom it may concern:*

Be it known that we, CHARLES O. COWGILL and CLYDE B. KIMBLE, citizens of the United States, residing in Des Moines, county of Polk, and State of Iowa, have invented a new and useful Improvement in Signal-Arm Lights, of which the following is a specification.

The object of this invention is to provide improved means for signaling from a vehicle the intention of the driver thereof of turning from a direct line of travel.

A further object of this invention is to provide improved mechanical means for operating a signal from the driver's seat, located at one side of the vehicle, to indicate the intention of the driver to turn the vehicle in the direction opposite to said driver's seat.

A further object of this invention is to provide improved means for operating an illuminated direction signal.

Our invention consists in the construction, arrangement and combination of elements hereinafter set forth, pointed out in our claims and illustrated by the accompanying drawing, in which—

Figure 1 is a rear elevation of our improved signaling device in closed or inoperative position, the position of the device in extended or signaling position being indicated by dotted lines. Fig. 2 is a front view of the operating device mounted on the steering column. Fig. 3 is an elevation at right angles to Fig. 2.

In the construction of the device as shown the numeral 10 designates generally a frame member of a vehicle, such as an automobile, said frame member here being illustrated as a side frame bar of a windshield of any suitable construction. A base plate 11 is provided at one end with an integral clamping member 12 adapted to embrace the frame bar 10 and be secured thereto by screws or bolts 13 passing therethrough and through a coöperating clamping member (not shown) mounted on the opposite side of the frame bar. The plate 11 projects laterally from the frame bar 10 and terminates in an integral arm 14 of lesser width than said plate. A compound lever 15, of the lazy-tongs type of construction, is pivoted at one end to a bolt 16 passing through the end portion of the arm 14, and said lazy-tongs may be of any desired length. A bracket 17 is clamped to the extremity of the last arm of the lazy-tongs 15, and a lamp casing 18 is secured to and carried by said bracket. The lamp casing 18 is provided with a glass 19, preferably red, in its rear face, and contains an electric bulb of common form (not shown) adapted to be illuminated by an electric current passing through conductors 20 from a suitable source of supply. When contracted the lazy-tongs 15 are adapted to withdraw the lamp 18 to a position adjacent to and above the base plate 11 and adjacent to the frame bar 10; and when extended said lazy-tongs are adapted to carry said lamp outwardly a material distance from said frame bar, and laterally from the base plate, as indicated by dotted lines in Fig. 1. When in such position the lamp 18 may be seen by a pedestrian or the driver of another vehicle to the rear of the one on which the device is mounted, and convey to such other person a signal that the driver of the vehicle in question is about to make a turn in the direction in which said lamp projects laterally. The lamp may be illuminated, particularly at night, to lend additional force to the mechanical signaling effect.

A plate 21 is secured, as by a clamp 22, to the steering column of the vehicle, a small portion only of which is shown and indicated by the numeral 23, and said plate preferably is located on the forward side of said column and adjacent to the steering wheel (not shown) where it can be easily reached by the driver. A lever 24 is fulcrumed at one end to the plate 21, said plate preferably being double with the lever mounted between the two members. A rather stiff wire 25 is secured at one end to and intermediate of the ends of the lever 24, passes down the steering column 23 to approximately the level of the bottom of the windshield, and extends to the location of the base plate 11 by any suitable course. The wire 25 is inclosed, throughout the greater portion of its length, by a cable or tube 26 which is secured at one end to the bottom of the plate 21, and adjacent its opposite end in a post 27 carried by the base plate 11, and equipped with a set screw 28 for engaging and holding said tube. The wire 25 projects beyond the latter end of the tube 26 and is secured at its end to the initial member of the lazy-tongs 15, said member projecting beyond the pivot 16 for the purpose of attachment of said wire. Downward movement of the free end of the lever 24, by manual pressure, has the effect of a pushing force on the wire 25 and on the projecting end of the lazy-tongs 15, to the end of contracting said lazy-tongs and moving the lamp 18 to inoperative position as shown in solid lines in Fig. 1. An opposite or upward movement of the free end of the lever, through a pull on the wire 25, has the effect of moving the lamp 18 to extended or operative position, as indicated by dotted lines in Fig. 1, to the end of conveying a signal to those following of the intention of the driver to turn in that direction.

The device constructed as above described may be very readily and easily attached, to either side of the vehicle, the intention being to locate it on the side opposite to the location of the driver's seat. As it is customary for drivers to indicate by the extension of an arm from the vehicle, their intention to turn in either direction, and as it is usually very inconvenient to so extend the arm on the side opposite to the location of the driver's seat, this device affords a convenient means particularly for signaling on the side opposite to the driver's seat, and to do it by the simple manipulation of a lever located near the seat.

The conductor 20 is made of sufficient length to permit an outward movement of the lamp casing 18 when the lazy-tongs are extended.

A stop 29 is formed on one arm of the lazy-tongs and is adapted to engage a margin of an adjacent arm and limit movement of the device in both directions, as indicated by the two showings in Fig. 1.

We claim as our invention—

1. In a vehicle signal, a horizontal member formed with means to secure same to the vehicle, lazy-tongs pivoted to said member, one of the levers of the lazy-tongs having an extension that projects below said pivot, a perforated post secured to said member, a tube extending through the perforation of the post, a set screw carried by the post and engaging said tube to rigidly connect the latter to the post, a stiff wire extending through the tube and exteriorly of the latter and connected to said lever extension of the lazy-tongs, and means to operate the wire.

2. In a vehicle signal, a horizontal member formed with means to secure same to the vehicle, lazy-tongs pivoted to said member, one of the levers of the lazy-tongs having an extension that projects below said pivot, a tube having an end thereof spaced from said lever extension, means to rigidly secure said end of the tube to said member, a stiff wire extending through said tube and exteriorly of said end thereof, and across the space between the lever extension and the end of the tube, and means to operate the wire.

3. In a vehicle signal, lazy-tongs normally extending vertically in inoperative position, means to pivotally connect the tongs to the vehicle, and means to operate the tongs by pulling and pushing same in a horizontal plane so as to swing same downwardly and outwardly.

CHARLES O. COWGILL.
CLYDE B. KIMBLE.

Copies of this patent may be obtained for five cents each, by addressing the "Commissioner of Patents, Washington, D. C."